US010805549B1

(12) United States Patent
Tsai

(10) Patent No.: US 10,805,549 B1
(45) Date of Patent: Oct. 13, 2020

(54) METHOD AND APPARATUS OF AUTO EXPOSURE CONTROL BASED ON PATTERN DETECTION IN DEPTH SENSING SYSTEM

(71) Applicant: HIMAX TECHNOLOGIES LIMITED, Tainan (TW)

(72) Inventor: Chin-Jung Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/546,266

(22) Filed: Aug. 20, 2019

(51) Int. Cl.
*H04N 5/235* (2006.01)
*H04N 13/254* (2018.01)

(52) U.S. Cl.
CPC ......... *H04N 5/2353* (2013.01); *H04N 5/2351* (2013.01); *H04N 13/254* (2018.05)

(58) Field of Classification Search
CPC ... H04N 5/2353; H04N 13/254; H04N 5/2351
See application file for complete search history.

(56) References Cited

U.S. PATENT DOCUMENTS

| 9,619,862 B2 * | 4/2017 | Zimmer | G06T 5/002 |
| 10,006,762 B2 * | 6/2018 | Furihata | G06T 7/521 |
| 10,325,377 B2 * | 6/2019 | Chang | G01P 3/36 |
| 10,332,306 B2 * | 6/2019 | Kohlbrenner | G06T 15/08 |
| 10,368,056 B2 * | 7/2019 | Wang | G08B 13/19 |
| 10,401,158 B2 * | 9/2019 | Gernoth | G06T 7/514 |
| 10,419,741 B2 * | 9/2019 | Calpe Maravilla | H04N 13/271 |
| 10,502,556 B2 * | 12/2019 | Meng | G01B 11/303 |
| 2006/0244749 A1 * | 11/2006 | Kondo | G06T 15/20 345/427 |
| 2008/0232679 A1 * | 9/2008 | Hahn | G06K 9/2036 382/154 |
| 2010/0118123 A1 * | 5/2010 | Freedman | G01B 11/25 348/46 |
| 2011/0058028 A1 * | 3/2011 | Sakai | G06K 9/72 348/77 |
| 2011/0169915 A1 * | 7/2011 | Bloom | G01B 11/25 348/46 |
| 2012/0051730 A1 * | 3/2012 | Cote | G03B 13/36 396/90 |

(Continued)

*Primary Examiner* — James M Pontius
(74) *Attorney, Agent, or Firm* — Winston Hsu

(57) ABSTRACT

A method for performing auto-exposure (AE) control in a depth sensing system includes: performing a rough pattern detection on a first reference frame to obtain a rough pattern detection result regarding a known pattern that is projected by the depth sensing system and calculating a pattern brightness mean; performing a depth decoding process with respect to a second reference frame that is derived based on the pattern brightness mean, thereby to obtain a depth decoding result; performing a mapping process according to the depth decoding result to obtain a mapping result; performing a fine pattern detection on the second reference frame according to the mapping result and the rough pattern detection result to obtain a fine pattern detection result; calculating a frame brightness mean according to the fine pattern detection result; and performing an AE control process over the depth sensing system according to the frame brightness mean.

20 Claims, 5 Drawing Sheets

(56) References Cited

U.S. PATENT DOCUMENTS

| | | | |
|---|---|---|---|
| 2012/0057803 A1* | 3/2012 | Wakazono | G06T 5/002 |
| | | | 382/274 |
| 2013/0051664 A1* | 2/2013 | Fujita | G06T 5/20 |
| | | | 382/165 |
| 2014/0003728 A1* | 1/2014 | Aoki | G06K 9/4614 |
| | | | 382/218 |
| 2014/0146041 A1* | 5/2014 | Jeon | G06T 5/005 |
| | | | 345/419 |
| 2014/0205015 A1* | 7/2014 | Rusert | H04N 19/44 |
| | | | 375/240.16 |
| 2014/0219549 A1* | 8/2014 | Choi | G06T 7/593 |
| | | | 382/154 |
| 2016/0150219 A1* | 5/2016 | Gordon | G06F 3/017 |
| | | | 348/46 |
| 2016/0223828 A1* | 8/2016 | Abraham | G06K 9/2036 |
| 2017/0068319 A1* | 3/2017 | Viswanathan | G06T 7/521 |
| 2017/0241767 A1* | 8/2017 | Miyata | G06K 9/4604 |
| 2017/0360295 A1* | 12/2017 | Oz | G06K 9/3233 |
| 2018/0321384 A1* | 11/2018 | Lindner | G01S 7/4808 |
| 2019/0066315 A1* | 2/2019 | Bleyer | G06T 7/49 |
| 2019/0087968 A1* | 3/2019 | Grunnet-Jepsen | H04N 13/254 |
| 2019/0273906 A1* | 9/2019 | Xiao | G02B 19/0014 |
| 2019/0355138 A1* | 11/2019 | Hall | H04N 5/2256 |
| 2019/0379881 A1* | 12/2019 | Tewes | H04N 13/254 |
| 2020/0082520 A1* | 3/2020 | Tang | G06K 9/2036 |
| 2020/0153206 A1* | 5/2020 | Wang | G02B 27/1086 |

* cited by examiner

METHOD AND APPARATUS OF AUTO EXPOSURE CONTROL BASED ON PATTERN DETECTION IN DEPTH SENSING SYSTEM

BACKGROUND OF THE INVENTION

1. Field of the Invention

The present invention relates generally to depth sensing, and more particularly, to an auto exposure control apparatus and method based on pattern detection in a depth sensing system.

2. Description of the Prior Art 3D cameras using structured light are a modified version of a stereo camera which uses two or more identical cameras to obtain depth information. Unlike the stereo camera, the 3D camera using structured light includes a camera and a projecting unit such as a beam projector instead of having two identical cameras. Such a structured light based camera system projects a known pattern on a scene or an object using the projecting unit, captures an image of the scene or the object with the known pattern projected thereon using an image capturing unit such as an image sensor, and obtains depth information by analyzing the obtained known pattern.

In the above-mentioned structured light based camera system, the precision of depth information depends on discrimination of the projected known pattern. However, it is difficult to discriminate the projected known pattern under an extreme or complicated illumination condition. For example, it is difficult to identify the projected known pattern from a scene or an object having low reflectivity surface because the images sensor cannot accurately capture the projected known pattern on the low reflectivity surface. On the contrary, it is also difficult to identify the projected known pattern from a scene or an object having high reflectivity such as an opalescent white object because the project known pattern may be saturated in a captured image due to the opalescent characteristic.

Therefore, there is a need for provide an auto-exposure control process for controlling an exposure level of an image senor as well as power of the projecting unit in the structured light based camera system.

SUMMARY OF THE INVENTION

With this in mind, it is one object of the present invention to provide an auto exposure control apparatus and method based on pattern detection in a depth sensing system. In the present invention, a rough pattern detection is firstly performed on a reference frame with a projected known pattern and a pattern brightness mean will be calculated in order to perform a rough exposure adjustment on the depth sensing system. Upon the rough exposure adjustment, a depth decoding and a mapping process will be performed to obtain disparity information regarding the projected known pattern. In a subsequence, a fine pattern detection result will be obtained. According to the fine pattern detection result, a fine exposure adjustment will be performed on the depth sensing system. With the rough exposure adjustment and the fine exposure adjustment, the auto exposure control process of the present invention can be faster and more accurate, such that the known pattern can be discriminated more precisely. In addition, by performing AE control properly and accurately, the depth sensing system can avoid unnecessary power consumption.

According to one embodiment, a method for performing auto-exposure (AE) control in a depth sensing system is provided. The method comprises: performing a rough pattern detection on a first reference frame to obtain a rough pattern detection result regarding a known pattern that is projected by the depth sensing system and calculating a pattern brightness mean regarding the rough pattern detection result; performing a depth decoding process with respect to a second reference frame that is derived based on the pattern brightness mean, thereby to obtain a depth decoding result; performing a mapping process according to the depth decoding result to obtain a mapping result; performing a fine pattern detection on the second reference frame according to the mapping result and the rough pattern detection result to obtain a fine pattern detection result; calculating a frame brightness mean according to the fine pattern detection result; and performing an AE control process over the depth sensing system according to the frame brightness mean.

According to one embodiment, an auto-exposure (AE) control apparatus in a depth sensing system is provided. The AE control apparatus comprises: a rough pattern detection unit, arranged to perform a rough pattern detection on a first reference frame to obtain a rough pattern detection result regarding a known pattern that is projected by the depth sensing system; a depth decoding unit, arranged to perform a depth decoding process with respect to a second reference frame that is derived based on a pattern brightness mean regarding the rough pattern detection result, thereby to obtain a depth decoding result; a mapping unit, arranged to perform a mapping process according to the depth decoding result to obtain a mapping result; a fine pattern detection unit, arranged to perform a fine pattern detection on the second reference frame according to the mapping result and the rough pattern detection result to obtain a fine pattern detection result; a mean calculation unit, arranged to calculate the pattern brightness mean regarding the rough pattern detection result and a frame brightness mean according to the fine pattern detection result; and an AE control unit, arranged to perform an AE control process over the depth sensing system according to the frame brightness mean.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

OVERVIEW

Figure 1:
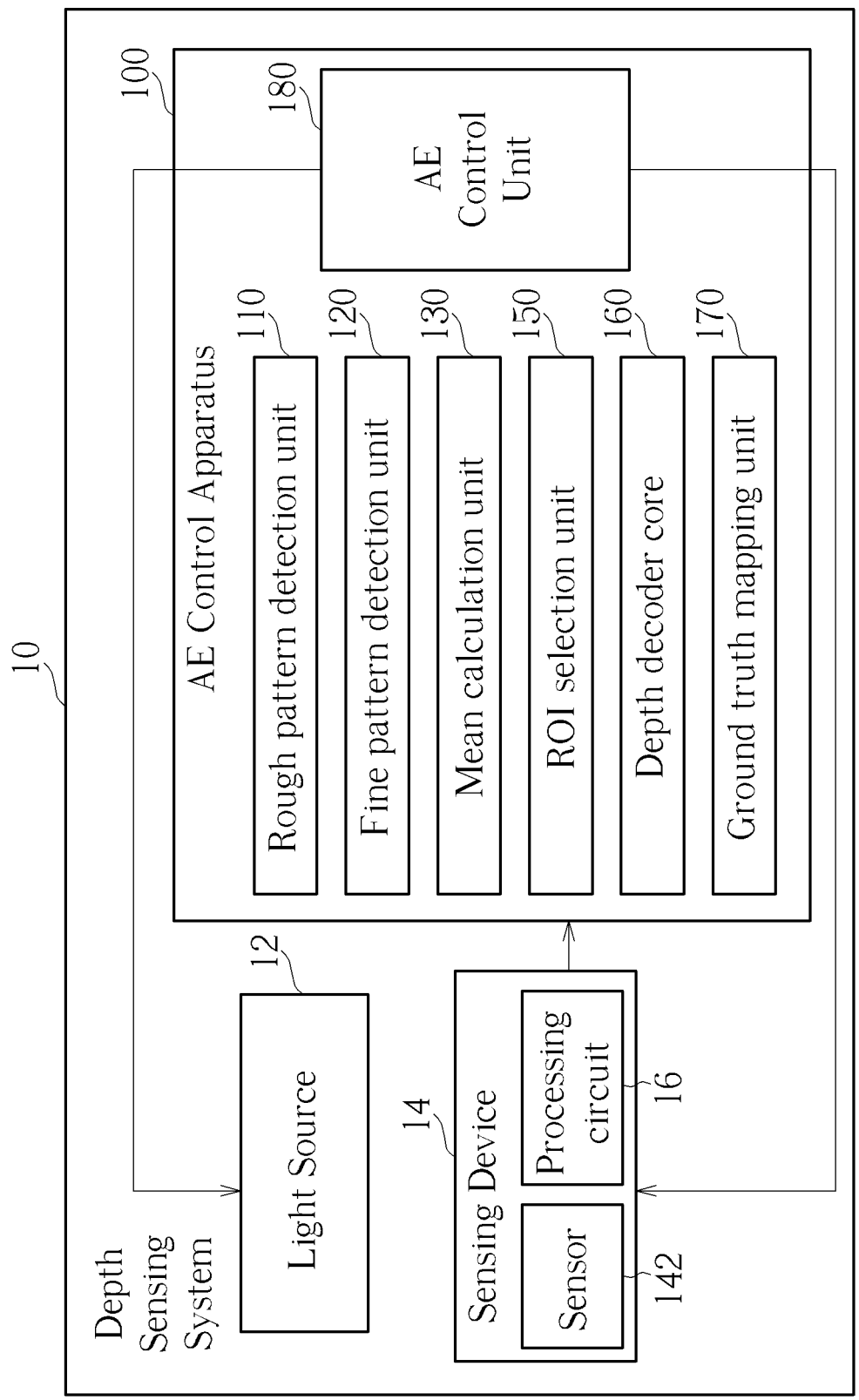
FIG. 1 illustrates a depth sensing system with an AE control apparatus according to one embodiment of the present invention.

FIG. 1 illustrates a block diagram of a depth sensing system 10 with an auto-exposure (AE) control apparatus 100 according to one embodiment of the present invention. The depth sensing system 10 includes a light source 12, a sensing device 14 and a processing circuit 16. Typically, the light source 12 is arranged to project a light with a known pattern 30 onto a scene or an object. The sensing device 14 is arranged to capture frames of the scene or the object in order for decoding the known pattern 30 projected on the scene or the object, thereby to determine depth information regarding the scene or the object. In one embodiment, the light source 12 is arranged to emit infrared (IR) light, while the sensing device 14 is capable of capturing IR light. The AE control apparatus 100 is arranged to control at least power for driving the light source 12 (e.g. the intensity of the light projected by the light source 12) as well as an exposure time and gain/sensitivity/ISO settings of a sensor 142 of the sensing device 14. The depth sensing system 10 relies on the with the AE control apparatus 100 to derive an image of the scene or the object with the known projected pattern 30 that is properly exposed, thereby to calculate the depth information regarding the scene/object.

In one embodiment, in order to save computation loading and power consumption, the processing circuit 16 of the sensing device 14 may produce signals from a sensor 142 of the sensing device 14 in a pixel-binning manner to combine signals of multiple pixels of the sensor 142 into a single one. Accordingly, a down-sampling process may be performed by the processing circuit 16 on the read out signals to derive a data with reduced amount. That is, data of multiple pixels on the sensor 142 will be combined thereby to obtain a frame with a much lower resolution than a native resolution provided by the sensor 142. For example, the sensor 142 may natively output a frame with 960×960 pixels. Through the pixel binning manner, a frame with 480×480 pixels can be obtained (2× pixel binning). Furthermore, through the down-sampling process, a frame with 480×120 pixels could be obtained (4× row down-sampling). Please note that scale factors for pixel binning and scale factors for down-sampling process factor could be varied in various embodiments of the present invention. Alternatively, it is also possible to omit one of the pixel binning and down-sampling processes if the power consumption is not a huge concerned.

AE Control Apparatus

The AE control apparatus 100 comprises a rough pattern detection unit 110, a fine pattern detection unit 120, a mean calculation unit 130, a region-of-interest (ROI) selection unit 150, a depth decoder core 160, a ground truth mapping unit 170 and an AE control unit 180.

Figure 2:
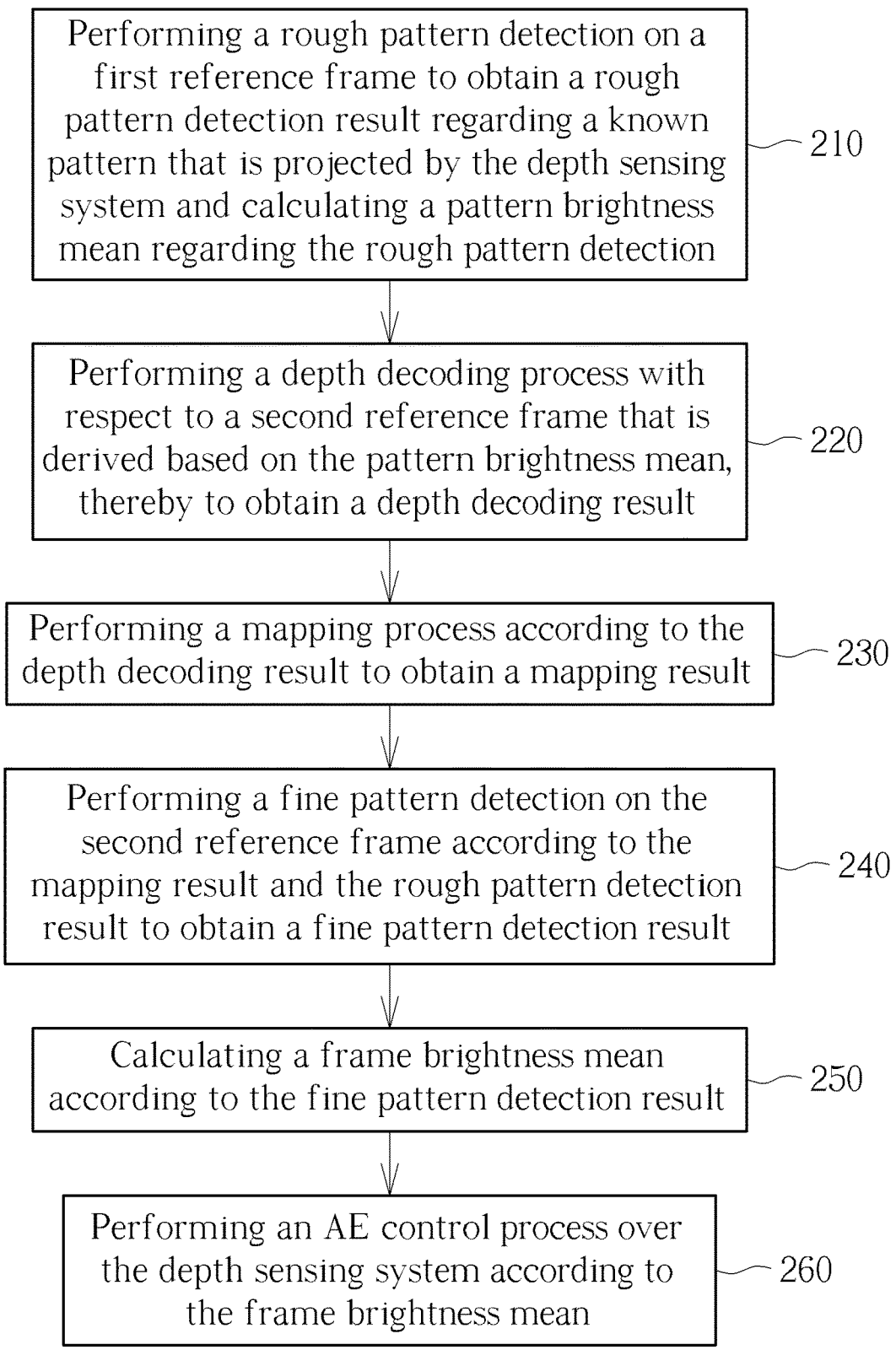
FIG. 2 illustrates a flow of operations of an AE control apparatus according to one embodiment of the present invention.

According to one embodiment of the present invention, operations of the AE control apparatus 100 can be summarized as a flow illustrated in FIG. 2, which includes the following step:

Step 210: performing a rough pattern detection on a first reference frame to obtain a rough pattern detection result regarding a known pattern that is projected by the depth sensing system and calculating a pattern brightness mean regarding the rough pattern detection;

Step 220: performing a depth decoding process with respect to a second reference frame that is derived based on the pattern brightness mean, thereby to obtain a depth decoding result;

Step 230: performing a mapping process according to the depth decoding result to obtain a mapping result;

Step 240: performing a fine pattern detection on the second reference frame according to the mapping result and the rough pattern detection result to obtain a fine pattern detection result;

Step 250: calculating a frame brightness mean according to the fine pattern detection result; and Step 260: performing an AE control process over the depth sensing system according to the frame brightness mean.

Figure 3A:
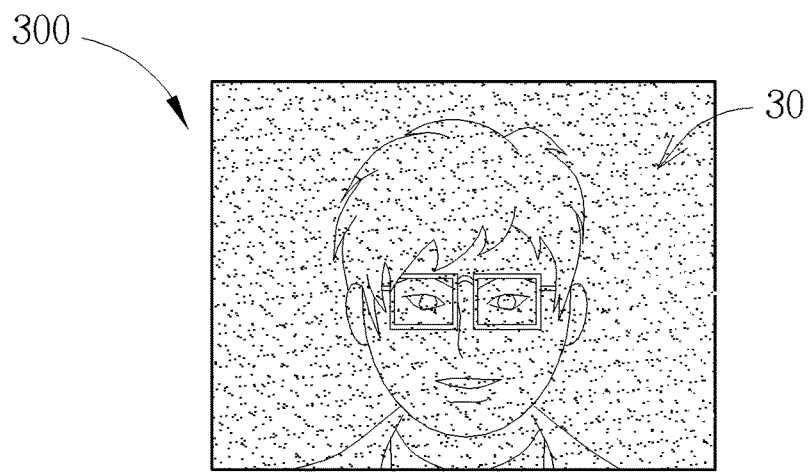
FIGS. 3A-3C illustrates how a rough pattern detection and a fine pattern detection work according to one embodiment of the present invention.
Figure 3B:
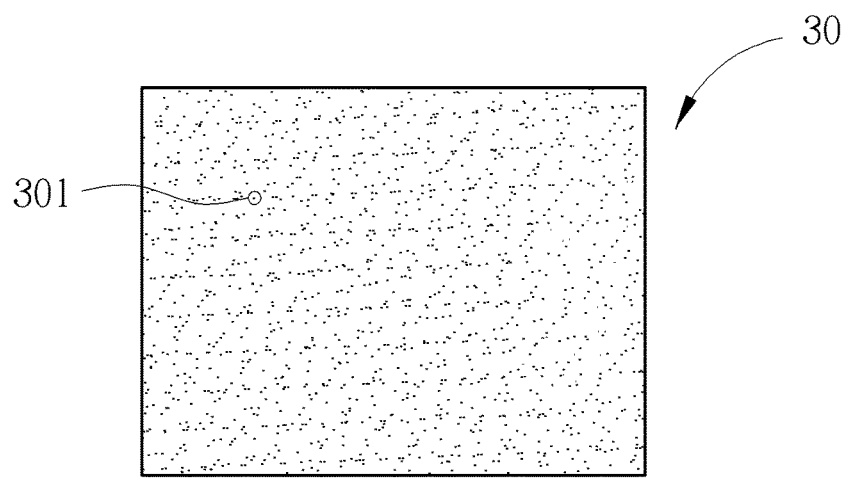

At Step 210, the rough pattern detection unit 110 is arranged to perform a rough pattern detection on a first reference frame RF1 (which may have a reduced solution than the native solution of the sensor 142) to obtain a rough pattern detection result regarding the known pattern 30 that is projected by the depth sensing system. FIG. 3A shows an example of a first reference frame RF1 (with the known pattern 30 projected thereto) that is provided by the sensing device 14. As can be seen from FIG. 3A, the known pattern 30 including a plurality of pattern elements 300 is projected on to a scene or an object and captured by the sensing device 14. The rough pattern detection result performed by the rough pattern detection unit 110 is intended to recognize the plurality of pattern elements 300 from the first reference frame RF1 thereby to estimate an illumination condition of the scene or the object. In one embodiment, the rough pattern detection unit 110 recognizes the plurality of pattern elements 300 by detecting the gradient values in the first reference frame RF1 to obtain the rough pattern detection result. For example, a pattern element 300 may be recognized if gradient values of a certain region in the first reference frame RF1 are greater than one or more threshold levels. FIG. 3B shows an example of the rough pattern detection result, which typically indicates positions and shapes of a plurality of roughly-recognized pattern elements 301 with respect to the first reference frame RF1. The plurality of roughly-recognized pattern elements 301 of FIG. 3B may not be consistent with the plurality of pattern elements 300 of the known pattern 30 due to noise, improper exposure, interference from ambient light, or other issues.

Accordingly, the mean calculation unit 130 is arranged to calculate a pattern brightness mean $P_{mean}$ regarding the rough pattern detection result, wherein the pattern brightness mean $P_{mean}$ can be a rough estimation of the illumination condition. In one embodiment, the mean calculation unit 130 is arranged to calculate a mean of brightness of each roughly-recognized pattern element 301 and select a maximum one from the mean of brightness of each roughly-recognized pattern element 301 as the pattern brightness mean $P_{mean}$. According to the pattern brightness mean $P_{mean}$, the AE control unit 180 will perform a rough exposure adjustment on the power for driving the light source 12 as well as an exposure time and gain/sensitivity/ISO settings of the sensor 142 of the sensing device 14 to compensate the exposure based on current illumination condition. In a preferred embodiment, the AE control unit 180 will compare pattern brightness mean $P_{mean}$ with a target brightness mean $T_{mean}$. If the pattern $T_{mean}$, brightness mean $P_{mean}$ is higher than the target brightness mean the power for driving the light source 12 may be reduced, the exposure time of the sensor 142 may be shortened and/or the gain/sensitivity/ISO settings of the sensor 142 may be leveled down. If the pattern brightness mean $P_{mean}$ is lower than the target brightness mean $T_{mean}$, the power for driving the light source 12 may be increased, the exposure time of the sensor 142 may be enlarged and/or the gain/sensitivity/ISO settings of the sensor 142 may be leveled up.

Figure 3C:
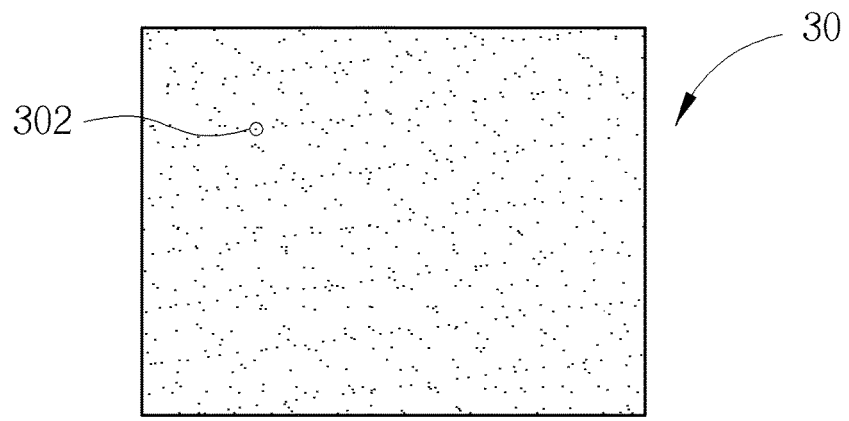

After the rough exposure adjustment, the sensing device 14 captures a second reference frame RF2 of the same scene or the same object with the known pattern 30 projected thereto. At step 220, the depth decoding core 160 could perform a depth decoding process with respect the second reference frame RF2, thereby to obtain a depth decoding result, which includes disparity information. At step 230, according to the disparity information provided by the depth decoding core 160, the ground truth mapping unit 170 performs a ground truth mapping process to obtain a mapping result, which includes more accurate position information regarding the pattern elements 300 with respect to the scene or the object. At step 240, the fine detection unit 120 could finely recognize positions of the pattern elements 300 according to the rough pattern detection result and the mapping result. Specifically, according to the mapping result, the fine detection unit 120 could exclude some of the roughly-recognized pattern elements 301 that are not actually the pattern elements 300. Such mistakes could be caused by noise, improper exposure, interference by the ambient light, or other issues. The fine detection unit 120 could generate a fine pattern detection result which indicates the position and shapes of a plurality of finely-recognized pattern elements 320 with respect to the second reference frame RF2. FIG. 3C shows an example of the fine pattern detection result. Please note that the present invention does not limit the known pattern 30 or the pattern elements 300 projected by the light source 12 in shape or in amount. There could be known patterns and pattern elements of other shapes and amounts according to various embodiments of the present invention. Therefore, FIG. 3A-3C should not be considered as a limitation of the present invention.

After the pattern elements 300 of the known pattern 30 are finely recognized by the fine pattern detection unit 120, the mean calculation unit 130 will determine a frame mean $F_{mean}$ for a fine exposure adjustment at step 250. At step 250, the ROI selection unit 150 will select one or more ROI blocks of the second reference frame RF2 (which will be illustrated later). Accordingly, the mean calculation unit 130 is arranged to calculate a sub-block mean for each ROI block, wherein the sub-block mean is a mean of brightness of the finely-recognized pattern elements 302 in an ROI block of the second reference frame RF2. Then, the mean calculation unit 130 selects a maximum one from the sub-block means of the ROI blocks of the second reference frame RF2 as the frame brightness mean $F_{mean}$, which is an accurate estimation of the illumination condition of the scene or the object.

At step 260, according to the frame brightness mean $F_{mean}$, the AE control unit 180 will perform a fine exposure adjustment on the power for driving the light source 12 as well as an exposure time and gain/sensitivity/ISO settings of the sensor 142 of the sensing device 14 to compensate the exposure of the depth sensing system 10 based on current illumination condition. In a preferred embodiment, the AE control unit 180 will compare the frame brightness mean $F_{mean}$ with the above-mentioned target brightness mean $T_{mean}$ and accordingly adjust the power for driving the light source 12, the exposure time and gain/sensitivity/ISO settings of the sensor 142 of the sensing device 14 as set forth above.

ROI Selection

Regarding the ROI selection process, the ROI selection unit 150 is used to exclude those blocks that are useless or obstructive in estimating the illumination condition of the scene/object. That is, the ROI selection unit 150 is arranged to exclude the blocks that could unfavorably affect the accuracy of the illumination condition estimation. For example, if a block is associated with an object in the scene with a low reflectivity or a far place in the scene. Such block will be excluded because the brightness of the finely-recognized pattern elements 302 in the block cannot fairly reflect the illumination condition of the scene properly. Similarly, if a block is associated with an object or apart of the scene that is over-exposed or under-exposed, the block will be also excluded since the brightness of the finely-recognized pattern elements 302 in the block cannot fairly reflect the illumination condition of the scene properly.

According to various embodiments of the present invention, there are several manners for the ROI selection unit 150 to select the ROI blocks of the second reference frame RF2. In one embodiment, the ROI selection unit 150 is arranged to perform exposure detection on the second reference frame RF2 to determine one or more blocks that are over-exposed or under-exposed. Accordingly, the ROI selection unit 150 excludes the one or more blocks that are determined over-exposed or under-exposed in selecting the one or more ROI blocks. In another embodiment, the ROI selection unit 150 is arranged to perform face recognition on the second reference frame RF2 to determine one or more face-associated blocks (i.e., associated with a region of human face) and select at least the one or more face-associated blocks as the one or more ROI blocks.

Figure 4A:
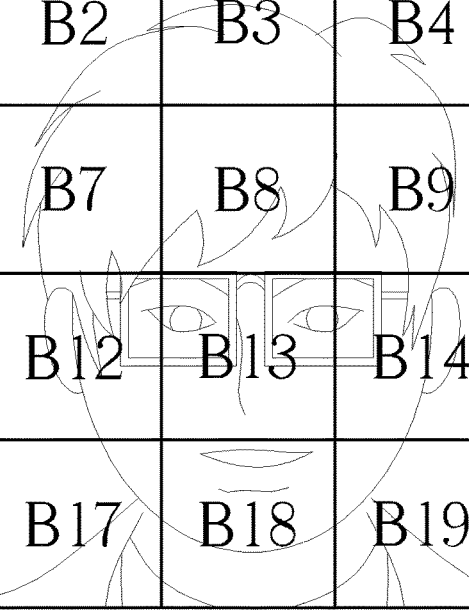
FIGS. 4A-4B illustrates how a ROI selection process works according to one embodiment of the present invention.
Figure 4B:
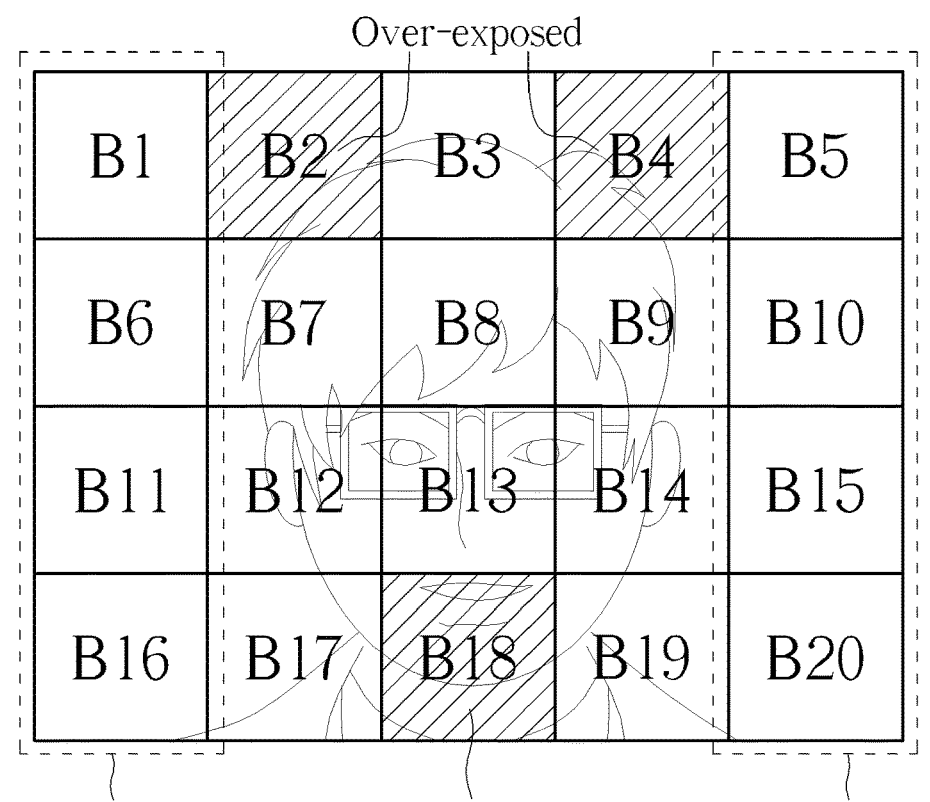

Please refer to FIGS. 4A and 4B according to embodiments of the present invention. FIG. 4A illustrates blocks of a second reference frame RF2. FIG. 4B illustrates a ROI selection result. As illustrated, the blocks B1, B5-B6, B10-B11, B15-B16 and B20 could be excluded in selecting the ROI blocks since they are not associated with human face. In addition, the blocks B2 and B4 could be excluded due to over-exposed. Furthermore, the block B18 could be excluded as due to under-exposed.

Sub-Block Mean

After the ROI blocks of the second reference frame RF2 have been selected, the mean calculation unit 130 will generate a sub-block mean for each ROI block. However, the mean calculation unit 130 could not generate the sub-block mean for certain ROI blocks in order to exclude useless or obstructive illumination information provided by these ROI blocks. That is, the excluded ROI block will not be taken into consideration in determining the frame brightness mean $F_{mean}$.

In one embodiment, the mean calculation unit 130 could determine a number of the finely-recognized pattern elements in each ROI block. Accordingly, if the number of the finely-recognized pattern elements 302 in an ROI block is lower than a threshold, the mean calculation unit 130 will not generate the sub-block mean for the ROI block. This is because such ROI block could not contribute enough information for illuminated condition. Hence, such ROI block will be excluded in calculating the frame brightness mean $F_{mean}$.

In one embodiment, the mean calculation unit 130 could determine a mean of brightness of the finely-recognized pattern elements 302 in each ROI block. Accordingly, if the mean of brightness of the finely-recognized pattern elements 302 in an ROI block is higher than an upper threshold or lower than a lower threshold, the mean calculation unit 130 will not generate the sub-block mean for the ROI block. This is because such ROI block may be obstructive in collecting information for estimating illumination condition. Hence, such ROI block will be excluded in calculating the frame brightness mean $F_{mean}$.

Figure 5:
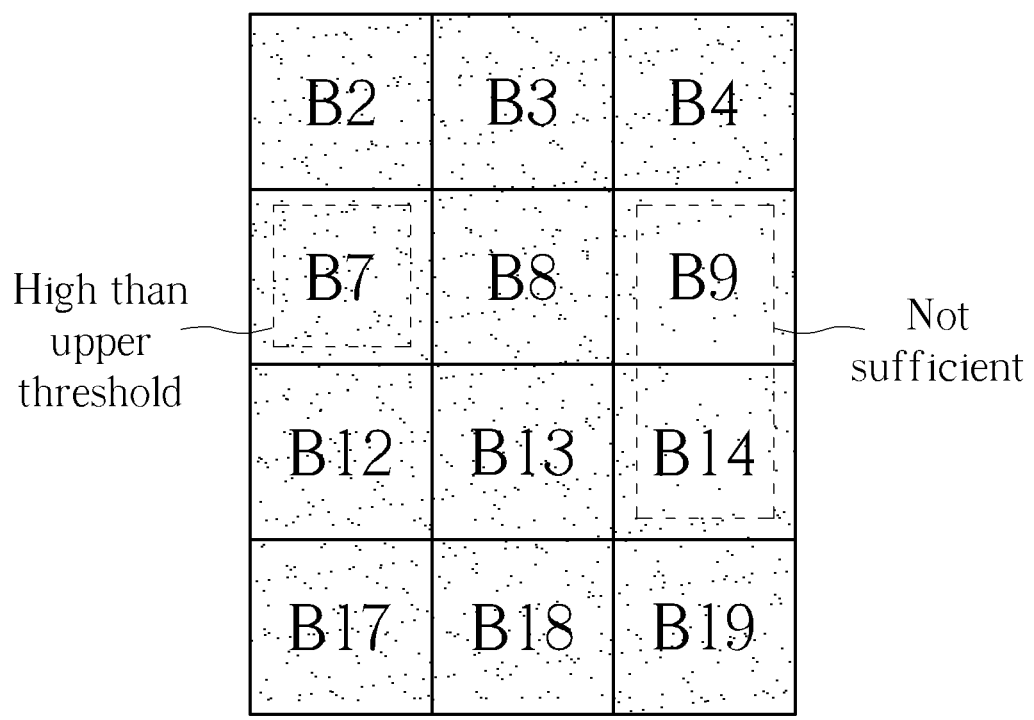
FIG. 5 illustrates an example of the sub-block mean calculation processing according to one embodiment of the present invention.

FIG. 5 illustrates an example of the sub-block mean calculation processing according to one embodiment of the present invention. As illustrated, the mean calculation unit 130 could exclude the ROI blocks B9 and B14 in calculate the sub-block mean since these ROI blocks include not enough finely-recognized pattern elements 302. Moreover, the mean calculation unit 130 could exclude the ROI block B7 since the mean of brightness of the finely-recognized pattern elements 302 in the ROI block B7 is higher than an upper threshold.

Afterward, the mean calculation unit 130 could calculate the frame brightness mean $F_{mean}$ according to the mean of brightness of the finely-recognized pattern elements of un-excluded ROI blocks.

In summary, the present invention provides method and apparatus for auto-exposure (AE) control in a depth sensing system with adjustments of two stages. In the first stage, a rough pattern detection is firstly performed on a first reference frame with a projected known pattern and a pattern brightness mean will be calculated, thereby to perform a rough exposure adjustment on the depth sensing system. Upon the rough exposure adjustment, a depth decoding and a mapping process will be performed to obtain disparity information regarding the projected known pattern. In a subsequence, a fine pattern detection result will be obtained. According to the fine pattern detection result, a fine exposure adjustment will be performed on the depth sensing system. In addition, to get accurate illumination condition estimation, the present invention relies on a ROI selection and sub-block mean calculation process to exclude information that is meaningless or obstructive in estimating the illumination condition of the scene. As a result, the AE control of the depth sensing system can be much faster and more accurate, such that the known pattern can be discriminated more precisely.

Embodiments of the present invention can be implemented using hardware, software, firmware, and/or combinations thereof. Through an appropriate instruction execution system, embodiments of the present invention can be implemented using software or firmware stored in a memory. In terms of hardware, embodiments of the present invention can be implemented using any of the following technologies or a combination thereof: a separate logic having a logic gate capable of performing a logic function according to a data signal, and an application specific integrated circuit (ASIC), a programmable gate array (PGA), or a field programmable gate array (FPGA) having suitable combinational logics.

Flowcharts and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing auto-exposure (AE) control in a depth sensing system, comprising:
    performing a rough pattern detection on a first reference frame to obtain a rough pattern detection result regarding a known pattern that is projected by the depth sensing system and calculating a pattern brightness mean regarding the rough pattern detection result;
    performing a depth decoding process with respect to a second reference frame that is derived based on the pattern brightness mean, thereby to obtain a depth decoding result;
    performing a mapping process according to the depth decoding result to obtain a mapping result;

performing a fine pattern detection on the second reference frame according to the mapping result and the rough pattern detection result to obtain a fine pattern detection result;

calculating a frame brightness mean according to the fine pattern detection result; and performing an AE control process over the depth sensing system according to the frame brightness mean.

2. The method of claim 1, further comprising:

performing the AE control process over the depth sensing according to the pattern brightness mean and a target brightness mean, thereby to obtain the second reference frame.

3. The method of claim 1, wherein the step of performing the rough pattern detection on the first reference frame comprises:

recognizing a plurality of pattern elements of the known pattern from the first reference frame by detecting gradient values in the first reference frame to obtain the rough pattern detection result, wherein the rough pattern detection result indicates a plurality of roughly-recognized pattern elements.

4. The method of claim 3, wherein the step of calculating a pattern brightness mean regarding the rough pattern detection result comprises:

calculating a mean of brightness of each roughly-recognized pattern element; and selecting a maximum one from the mean of brightness of each roughly-recognized pattern element as the pattern brightness mean.

5. The method of claim 3, wherein the step of performing the fine pattern detection on the second reference frame comprises:

excluding some of the roughly-recognized pattern elements according to the mapping result to obtain the fine pattern detection result, wherein the fine pattern detection result indicates a plurality of fine-recognized pattern elements.

6. The method of claim 5, wherein the step of calculating the frame brightness mean according to the fine pattern detection result comprises:

performing a region of interest (ROI) selection process to select one or more ROI blocks of the second reference frame;

generating a sub-block mean of each ROI block, wherein the sub-block mean is a mean of brightness of the finely-recognized pattern elements in the ROI block; and selecting a maximum one from sub-block means of the second reference frame as the frame brightness mean.

7. The method of claim 6, wherein the step of calculating the sub-block mean comprises:

determining a number of the finely-recognized pattern elements in each ROI block;

not generating the sub-block mean for an ROI block if the number of the finely-recognized pattern elements in the ROI block is lower than a threshold.

8. The method of claim 6, wherein the step of calculating the sub-block mean comprises:

determining a mean of brightness of the finely-recognized pattern elements in each ROI block;

not generating the sub-block mean for an ROI block if the mean of brightness of the finely-recognized pattern elements in the ROI is higher than a upper threshold or lower than a lower threshold.

9. The method of claim 6, wherein the step of performing the ROI selection process to select one or more ROI blocks of the second reference frame comprises:

performing exposure detection on the second reference frame to determine one or more blocks that are over-exposed or under-exposed; and excluding the one or more blocks that are determined over-exposed or under-exposed in selecting the one or more ROI blocks.

10. The method of claim 1, wherein the step of performing the AE control process over the depth sensing system comprises:

adjusting at least one of power for driving a light source of the depth sensing system, an exposure time of a sensor of the depth sensing system, and a gain setting of the sensor.

11. An auto-exposure (AE) control apparatus in a depth sensing system, comprising:

a rough pattern detection unit, arranged to perform a rough pattern detection on a first reference frame to obtain a rough pattern detection result regarding a known pattern that is projected by the depth sensing system;

a depth decoding unit, arranged to perform a depth decoding process with respect to a second reference frame that is derived based on a pattern brightness mean regarding the rough pattern detection result, thereby to obtain a depth decoding result;

a mapping unit, arranged to perform a mapping process according to the depth decoding result to obtain a mapping result;

a fine pattern detection unit, arranged to perform a fine pattern detection on the second reference frame according to the mapping result and the rough pattern detection result to obtain a fine pattern detection result;

a mean calculation unit, arranged to calculate the pattern brightness mean regarding the rough pattern detection result and a frame brightness mean according to the fine pattern detection result; and an AE control unit, arranged to perform an AE control process over the depth sensing system according to the frame brightness mean.

12. The apparatus of claim 11, wherein the AE control unit is arranged to perform the AE control process over the depth sensing according to the pattern brightness mean and a target brightness mean, thereby to obtain the second reference frame.

13. The apparatus of claim 11, wherein the rough pattern detection unit is arranged to recognize a plurality of pattern elements of the known pattern from the first reference frame by detecting gradient values in the first reference frame to obtain the rough pattern detection result, wherein the rough pattern detection result indicates a plurality of roughly-recognized pattern elements.

14. The apparatus of claim 13, wherein the mean calculation unit is arranged to calculate a mean of brightness of each roughly-recognized pattern element and select a maximum one from the mean of brightness of each roughly-recognized pattern element as the pattern brightness mean.

15. The apparatus of claim 13, wherein the fine pattern detection unit is arranged to exclude some of the roughly-recognized pattern elements according to the mapping result to obtain the fine pattern detection result, wherein the fine pattern detection result indicates a plurality of fine-recognized pattern elements.

16. The apparatus of claim 15, wherein the apparatus further comprises:

an region of interest (ROI) selection unit arranged to perform a ROI selection process to select one or more ROI blocks of the second reference frame;

wherein the mean calculation unit is arranged to calculate a sub-block mean of each ROI block, wherein the sub-block mean is a mean of brightness of the finely-recognized pattern elements in the ROI block and select a maximum one from sub-block means of the second reference frame as the frame brightness mean.

17. The apparatus of claim 16, wherein the mean calculation unit is arranged to determine a number of the finely-recognized pattern elements in each ROI block; and the mean calculation unit does not generate the sub-block mean for an ROI block if the number of the finely-recognized pattern elements in the ROI block is lower than a threshold.

18. The apparatus of claim 16, wherein the mean calculation unit is arranged to determine a mean of brightness of the finely-recognized pattern elements in each ROI block; and the mean calculation unit does not generate the sub-block mean for an ROI block if the mean of brightness of the finely-recognized pattern elements in the ROI block is higher than a upper threshold or lower than a lower threshold.

19. The apparatus of claim 16, wherein the ROI selection unit is arranged to perform exposure detection on the second reference frame to determine one or more blocks that are over-exposed or under-exposed and exclude the one or more blocks that are determined over-exposed or under-exposed in selecting the one or more ROI blocks.

20. The apparatus of claim 11, wherein the AE control unit is arranged to adjust at least one of power for driving a light source of the depth sensing system, an exposure time of a sensor of the depth sensing system, and a gain setting of the sensor.

* * * * *